United States Patent
Emerson et al.

(10) Patent No.: US 10,745,976 B2
(45) Date of Patent: Aug. 18, 2020

(54) ORTHOGONAL ELECTRICAL CONNECTOR PENETRATOR SYSTEM FOR COILED TUBING ELECTRICAL SERVICE IN A FLOW-THROUGH MULTI-BOWLED WELLHEAD AND METHOD OF INSTALLATION AND USE

(71) Applicant: Quick Connectors, Inc., Houston, TX (US)

(72) Inventors: Tod D. Emerson, Magnolia, TX (US); Jim Williams, Montgomery, TX (US); J. Patrick Payne, League City, TX (US)

(73) Assignee: QUICK CONNECTORS, INC., Houston, TX (US)

( * ) Notice: Subject to any disclaimer, the term of this patent is extended or adjusted under 35 U.S.C. 154(b) by 243 days.

(21) Appl. No.: 15/326,897

(22) PCT Filed: Jul. 17, 2015

(86) PCT No.: PCT/US2015/040864
§ 371 (c)(1),
(2) Date: Jan. 17, 2017

(87) PCT Pub. No.: WO2016/011326
PCT Pub. Date: Jan. 21, 2016

(65) Prior Publication Data
US 2017/0211339 A1    Jul. 27, 2017

Related U.S. Application Data

(60) Provisional application No. 62/026,325, filed on Jul. 18, 2014.

(51) Int. Cl.
*E21B 17/02* (2006.01)
*E21B 17/20* (2006.01)
*E21B 43/12* (2006.01)
*H01R 13/52* (2006.01)
(Continued)

(52) U.S. Cl.
CPC ......... *E21B 17/028* (2013.01); *E21B 17/023* (2013.01); *E21B 17/025* (2013.01);
(Continued)

(58) Field of Classification Search
CPC .... E21B 33/0385; E21B 33/03; E21B 43/128; E21B 17/206; E21B 17/025;
(Continued)

(56) References Cited

U.S. PATENT DOCUMENTS

| 4,289,199 A | * | 9/1981 | McGee | E21B 33/0407 |
| | | | | 166/65.1 |
| 4,589,492 A | * | 5/1986 | Greiner | E21B 33/0385 |
| | | | | 166/338 |

(Continued)

FOREIGN PATENT DOCUMENTS

WO    WO-2012079071 A1 *  6/2012  ........... E21B 17/003

*Primary Examiner* — Robert E Fuller
*Assistant Examiner* — Theodore N Yao
(74) *Attorney, Agent, or Firm* — MH2 TECHNOLOGY LAW GROUP LLP

(57) ABSTRACT

An electrical interconnect system which allows electrical service to be provided to an ESP suspended on coiled tubing without exiting the wellhead at the top of the well head structure, with three aligned plugs into which is inserted an exterior plug providing each leg of the electrical service to the ESP within the well.

17 Claims, 4 Drawing Sheets

(51) Int. Cl.
  *H01R 24/28*    (2011.01)
  *H01R 43/00*    (2006.01)
  *H01R 105/00*   (2006.01)
  *E21B 33/03*    (2006.01)
  *E21B 33/038*   (2006.01)
  *H02K 3/30*     (2006.01)

(52) U.S. Cl.
  CPC ........ *E21B 33/0385* (2013.01); *E21B 43/128* (2013.01); *H01R 13/52* (2013.01); *H01R 24/28* (2013.01); *H01R 43/005* (2013.01); *H01R 2105/00* (2013.01); *H02K 3/30* (2013.01)

(58) Field of Classification Search
  CPC .... E21B 17/023; E21B 17/003; E21B 17/028; H01R 43/005; H01R 24/28; H01R 13/52
  See application file for complete search history.

(56) References Cited

U.S. PATENT DOCUMENTS

| | | |
|---|---|---|
| 5,762,135 A | 6/1998 | Moore |
| 6,681,861 B2* | 1/2004 | Davidson ............ E21B 33/0385 166/382 |
| 7,232,347 B1* | 6/2007 | Moore ................. H02G 15/013 174/89 |
| 2006/0148304 A1 | 7/2006 | Kennedy et al. |
| 2009/0317997 A1 | 12/2009 | Watson et al. |
| 2010/0294481 A1* | 11/2010 | Vanderford ............. E21B 33/03 166/75.11 |
| 2011/0017510 A1* | 1/2011 | Emerson ............... E21B 17/028 174/84 C |
| 2013/0309888 A1 | 11/2013 | Nicholson |
| 2015/0068769 A1 | 3/2015 | Xiao et al. |

\* cited by examiner

ORTHOGONAL ELECTRICAL CONNECTOR PENETRATOR SYSTEM FOR COILED TUBING ELECTRICAL SERVICE IN A FLOW-THROUGH MULTI-BOWLED WELLHEAD AND METHOD OF INSTALLATION AND USE

BACKGROUND OF INVENTION

The present invention relates to an electrical connector penetrator system for use in an oil well serviced by a electrical submersible pump (ESP) connected to a coiled tubing string having an ESP power cable retained in the coiled tubing; and, more specifically, to an electrical connector penetrator system exits the wellhead at a right angle, or orthogonally, to the longitudinal bore of the well, while the produced fluid exits the wellhead through a conventional vertical "Christmas" tree, thereby providing a continuous connection from a coiled tubing retained in a hanger containing the electrical conductors providing power to the ESP.

It is highly desirable to provide electrical power through a coiled tubing system attached to an ESP and to provide such an electrical connector penetrator system through an annulus of a production tubing without using the vertical space above a production wellhead tree. This would allow a coiled tubing injector to be placed over the wellhead and to allow insertion and removal of the ESP connected to a coiled tubing in a live well, without having to kill the well to remove the wellhead and electrical cable supplying the ESP.

Accordingly, Applicant designed and implemented an electrical connector mounted on a coiled tubing hanger arrangement sealing the coiled tubing, which is then set in a coiled tubing hanger, inside a bowl of a flow-through wellhead.

SUMMARY OF INVENTION

This orthogonal electrical connector system comprises an electrical conductor seal mandrel adapted to attach to a ESP power cable providing at least three conductors through a coiled tubing; a non-conductive connector sleeve enclosing the at least three electrical conductors providing at least three spaced ports permitting the at least three conductors to connect to an interior electrical plug inserted at right angles within the connector sleeve; and, an exterior plug inserted through a wellhead mating with each of the at least three spaced electrical interior plugs in the connector sleeve. The orthogonal electrical connector system can be arranged to provide the at least three spaced ports positioned vertically within the connector sleeve or positioned horizontally within the connector sleeve.

The at least three conductors extend through the seal mandrel sealed with epoxy surrounding each conductor within the seal mandrel.

The orthogonal electrical connector system can also provide non-conductive connector sleeve aligned within the wellhead to assure alignment of the at least three spaced ports through which the electrical connection is made from the exterior of the flow-through wellhead.

A method for installing an orthogonal electrical connector system on coiled tubing connected to an ESP, retained in a coiled tubing hanger assembly, comprises the steps of rough-cutting an armored cable extending from the coiled tubing to an appropriate length; inserting the armored cable in a mini-mandrel collar and into a mini-mandrel; cutting the armor and stripping the secondary insulation or insulation protection (typically the lead jacket) from a plurality of conductors within the armored jacket without removing the insulation on each conductor; inserting each conductor into a steel tube pressed into a non-ferromagnetic seal body; inserting an elastomeric seal around each steel tube leaving a space between the non-ferromagnetic seal body and the elastomeric seal; filling all interior spaces of the mini-mandrel with epoxy; and, retaining the mini-mandrel in the mini-mandrel collar and thread the collar to the coiled tubing hanger assembly retaining the mini-mandrel on an interior shoulder of the mini-mandrel collar and permitting the electrical conductors to extend there-through.

This method can further comprise the steps of combining one or more PEEK disks providing an opening vertically aligned in a spaced relationship; inserting in each vertically aligned disk an electrical connector attached thereto; attaching a length of electrical conductor to each spaced electrical connector extending through an interior passage to a proximal end of the arrangement; connecting each electrical conductor to a socket permitting connection of the electrical conductors extending from the mini-mandrel; and attaching the PEEK mandrel body comprised of the PEEK disks to the mini-mandrel cap with set screws on a circumferential surface of the mandrel body.

DETAILED DESCRIPTION OF THE DRAWINGS

DETAILED DESCRIPTION OF AN EMBODIMENT OF THE INVENTION

Figure 1:
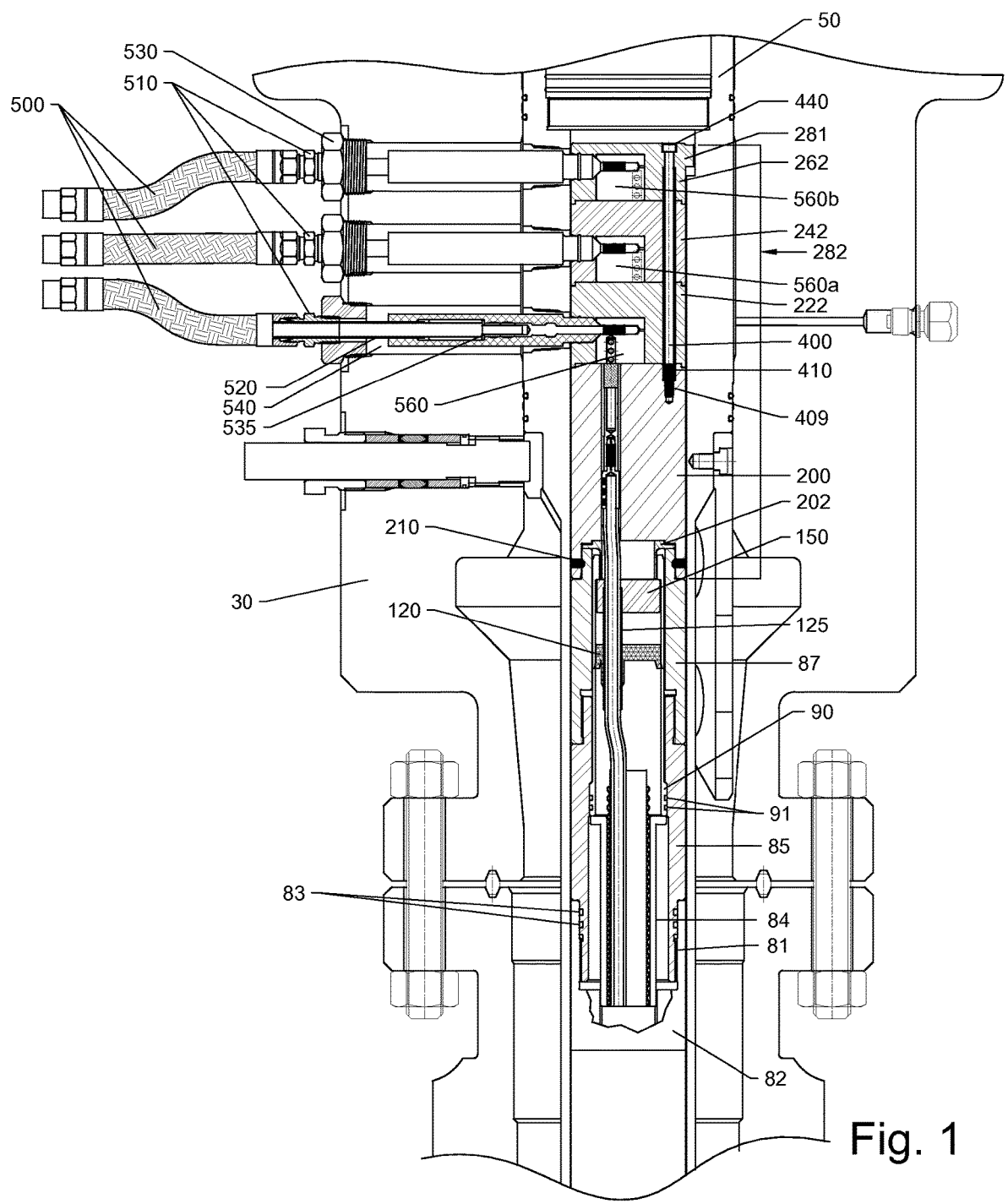
FIG. 1 is a composite drawing of the entire assembly of the orthogonal electrical connector system for coiled tubing electrical service in a flow-through wellhead.

FIG. 1 is a partial cross-sectional drawing of the entire wellhead assembly including the orthogonal electrical penetrator assembly. The flow-through multi-bowled wellhead 30 consists of at least two aligned portions or bowls providing a number of flow-through passages (not shown) communicating with the well below, and an inner casing 50 for hanging and manipulation of a coiled tubing attached to the wellhead. Each of these two bowls 30 and 50 provides at least three alignable ports 540 permitting an orthogonal electrical connection to be made to the ESP. Each alignable port 540 provides means for insertion of an elastomeric covered electrical connector 535 providing a male pin which can be stabbed into an orthogonal pin connector 560, 560a and 560b seated within a PEEK cable manifold 222, 242 and 262. Each of the bowls 30 and 50 are aligned to allow these three pins to be inserted within the exterior plug 530 found on each pin, although only one complete assembly is shown in FIG. 1. To permit alignment of each of the pins with the orthogonal pin connector 560, 560a and 560b, a void or port 540 is created around each pin and, upon installation, this void or port 540 is filled with a dielectric grease such as DC 104 or DC 111. The electrical conductors are inserted through metallic tubes 520 which are then locked into place on the exterior surface of the wellhead by compression fitting 510 threaded into external plug 530 that is connected to flex-tubing 500 extending from the wellhead surface of bowl 30 to a junction box (not shown) to provide power to the ESP within the well. Each port or void 540 is sealed by an external plug 530 enclosing the aligned orthogonal pin connectors 560, 560a, and 560b.

Each of the orthogonal connectors 560, 560a and 560b is housed within the PEEK cable manifold 222, 242 and 262. The stackable cable splice manifolds and sleeve of this embodiment 200, 222, 242, 262 forming the mandrel 282 could be molded from a single piece of PEEK.

Figure 4:
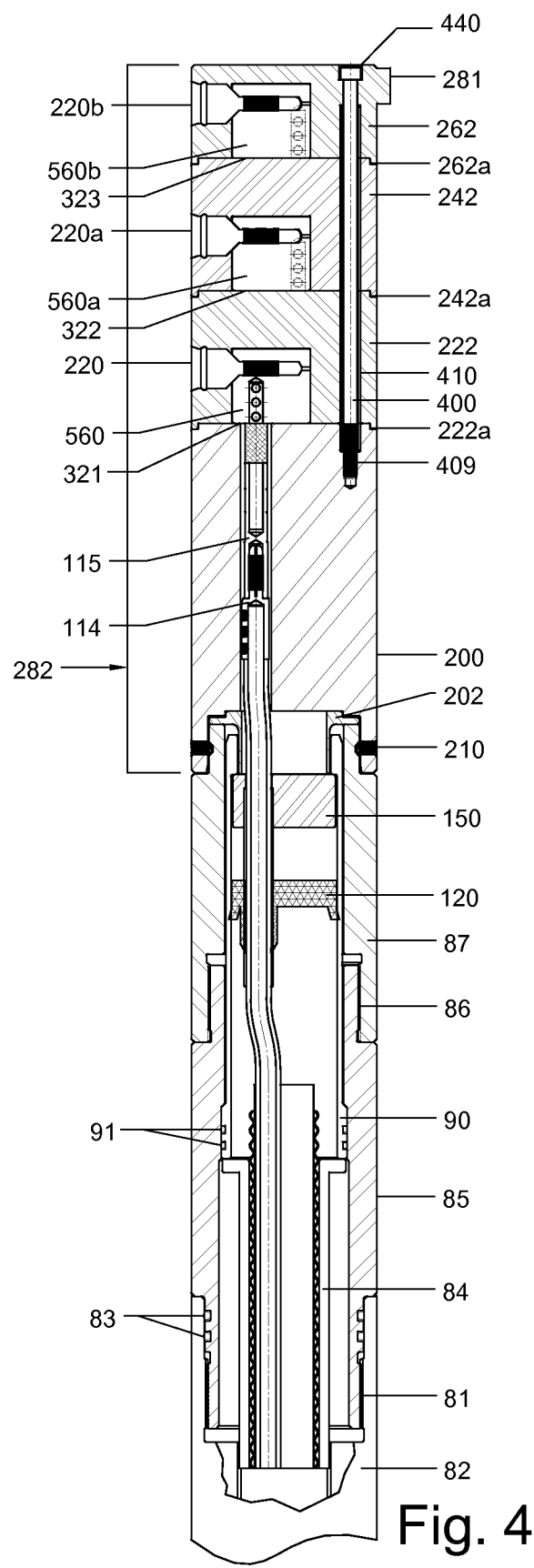
FIG. 4 is a cross-sectional view of the PEEK mandrel showing the vertical alignment ports through the mandrel attached to the mini-mandrel collar threaded on the mini-mandrel collar then threaded together to the slip connection.

FIG. 4, a view of the assembly without the cross-sectional view of the wellhead, provides a cross-sectional view of the PEEK mandrel 282 showing the vertical alignment ports 220, 220a and 220b through the mandrel 282 attached to the threaded sleeve 87 threaded on the mandrel sleeve 85 and threaded together 86 to the slip connection 82. Each of the vertically spaced and aligned ports 220, 220a and 220b are approximately two (2) inches apart which provides sufficient dielectric strength to prevent shorting of one connection with an adjacent connection during use. In this embodiment, the PEEK mandrel is segmented into stackable cable manifolds 222, 242, and 262. Each of these trays is held together by cap headed screw 400 threaded into internal threads 409 in the base PEEK cable splice sleeve 200. The head 440 of the cap head screw engages the cable manifold 262 to compressively maintain the PEEK mandrel as a unit after installation. The screw 400 provides insulation 410 within each PEEK tray to prevent a pathway for leaking of current during operation. The cable manifold 262 provides a key 281 to align the entire PEEK mandrel body 282 after installation. During installation, each passage would be packed with dielectric grease such as DC 4 or DC 111 to avoid further communication with these connectors.

Figure 2:
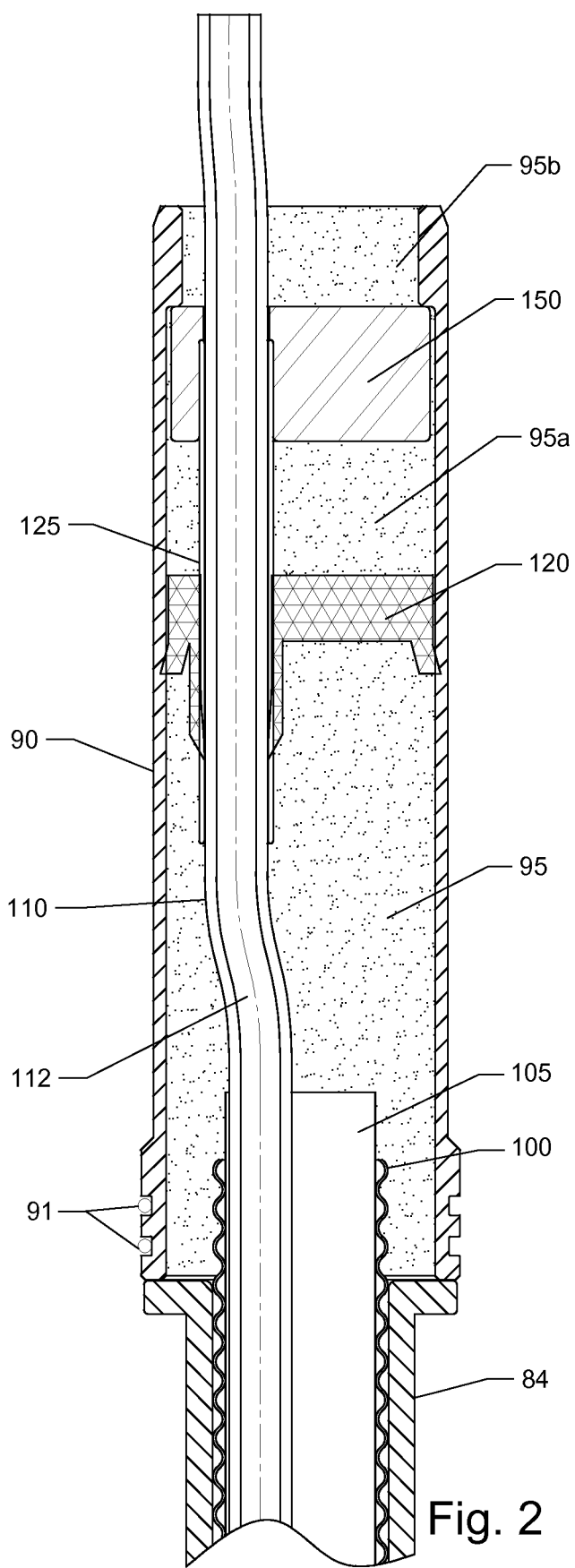
FIG. 2 is a cross-sectional view of electrical conductor mini-mandrel.

As next shown in FIG. 2, a quantity of epoxy 95 covers each of the conductors 112 from their exit from the armored cable 100 and shield 105 adjacent an elastomeric seal cup 120 slipped over the stainless steel tubing covering each insulated conductor 112. A second quantity of epoxy 95a is installed between the elastomeric seal cup and the tri-hooter or non-ferromagnetic conductor 150. Additional quantities of epoxy 95b can be put in the distal end of the mini-mandrel to completely fill the mini-mandrel and support the electrical conductors extending from the mini-mandrel into a PEEK cable splice sleeve 200 providing a plurality of ports 220 for connecting electrical plugs from the outer periphery of a flow-through wellhead.

Figure 3:
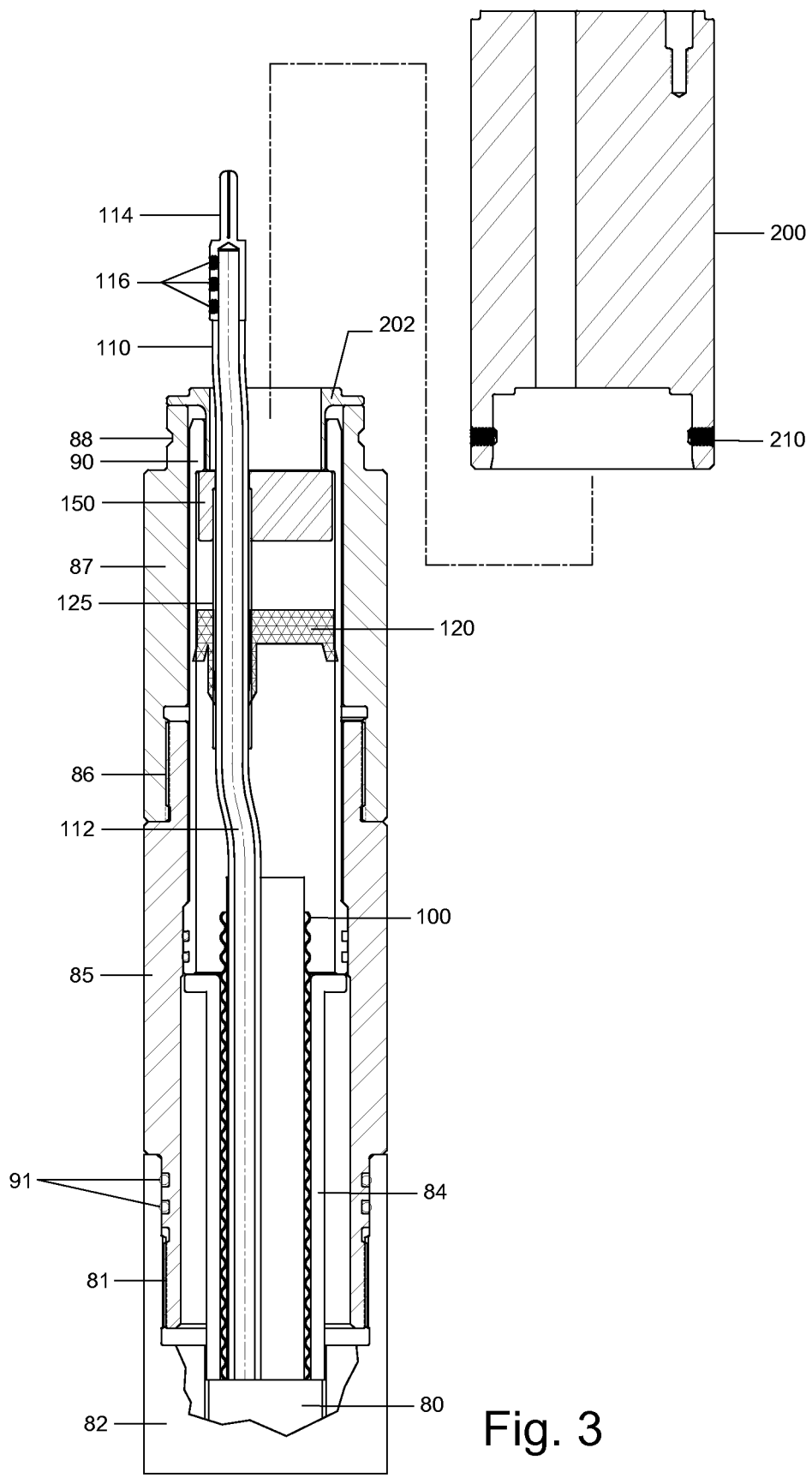
FIG. 3 is a cross-sectional view of the electrical conductor mini-mandrel installed within the mandrel collar connected to a coiled tubing hanger assembly and sealed within the mandrel collar by a mandrel cap through which the electrical conductors are carried and showing the groove around an upper end of said cap into which set screws from the PEEK mandrel are seated.

As shown more completely in FIG. 3, a coiled tubing 80 supporting an ESP power cable 100 is hung in a system of slips (not shown) and slip connection 82 within a wellbore allowing a portion of the ESP power cable 100 to extend out of the coiled tubing 80. A portion of the power cable 100 is then removed and the individual electrical conductors 112 are exposed. Each conductor retains its protective dielectric covering 110 made from EPDM and extends through the non-conductive, protective mini-mandrel 90 permitting the electrical conductors to be fed through a plurality of steel tubes 125 which are inserted in an elastomeric seal 120 then press fitted into a tri-hooter or non-ferromagnetic cap 150 retained within the mini-mandrel 90 at an interior shoulder. Each electrical conductor is thus sealed within the seal mini-mandrel 90 on which, at a lower end, O-rings 91 are installed to seal on an interior surface of the mandrel sleeve 85.

The mini-mandrel 90 is installed within the mandrel sleeve 85 which is threaded into or otherwise connected to the coiled tubing hanger system 82 supporting the coiled tubing 80 in slips (not shown) and providing support for the armored cable 100 constrained within said coiled tubing 80. Electrical conductors 112 pass through the mini-mandrel 90 with each remaining protected by the insulation 110. Each electrical conductor 112 is stripped at its distal end and an electrically conductive male plug 114 is attached with set screws 116.

The installation of the mini-mandrel 90 is readily accomplished. The coiled tubing 80 is secured in slips (not shown) within the wellhead. The armored power cable 100 extends from the top of the coiled tubing 80 and is rough-cut to a fixed distance above the end of the coiled tubing slips. A packing sleeve 84 is then slipped over the power cable 100 and shouldered against coil tubing 80. The mandrel sleeve 85 is slipped over the armored cable and the electrical conductors 112, covered by their insulation 110 are threaded through and sealed within the mini-mandrel 90. The mini-mandrel 90 is compressed to shoulder against packing sleeve 84 and then the mandrel sleeve 85 is threaded into the interior threads of the coiled tubing slip 82. After the electrical conductors 112 are stripped and the male electrical conductive plugs 114 are installed of each of the conductors, the mini-mandrel cap 87 is threaded on the exterior threads of the mandrel sleeve 85 sealing the lower portion of the assembly and providing the groove 88 for the set screws 210 on the circumferential lower end of the PEEK cable splice sleeve 200 to be affixed after insertion of each of the conductors in their respective electrical pin connectors within the PEEK mandrel.

FIG. 4 provides a cross-sectional view of the PEEK mandrel 282 showing the vertical alignment ports 220, 220a and 220b through the mandrel 282 attached to the mini-mandrel collar 87 threaded on the mandrel sleeve 85 and threaded together to the slip connection 82 all as previously described. Mandrel cap 202 provides a seat between the mini-mandrel collar 87 and cable splice sleeve 200.

Alternatively, the PEEK mandrel 282 can be molded as one piece with electrical connector sockets installed in the mandrel to allow insertion of the orthogonal male plugs through the aligned wellhead ports to the interior of the wellhead.

Continuing the discussion of the structure shown in FIG. 1, FIG. 4 provides more detail. In this embodiment, the male plug 114 is inserted in a crimp socket 115 from which another section of insulated cable is inserted in an orthogonal electrical connector 560, 560a and 560b disposed in segmented PEEK disks providing indented trays 321, 322, and 323. Similar connections are made with the remaining conductors (not shown) and each orthogonal connector cavity 220, 220a and 220b is thus spaced vertically allowing a male plug to be inserted through an aligned wellhead to connect each of the orthogonal plugs to an exterior surface of the flow-through wellhead (not shown in this view). As each orthogonal plug is completed the indented trays are covered by the adjacent PEEK disk. For example, once the makeup for plug 560 is completed, indented tray 321 is covered by the PEEK cable splice sleeve 200. Likewise when electrical connector 560a is completed, indented tray 322 is covered by PEEK cable manifold 222. Finally, when the last electrical connector is completed in indented tray 323, PEEK cap cable manifold 262 completely seals each electrical orthogonal connector in the PEEK mandrel 282. Each disk is lipped 222a, 242a, 262a to provide an interconnecting unit that can then be sealed together with threaded rods or pins, such as the cap head screw 400 which engages threads 409 in the bottom PEEK mandrel body 282 to provide a rigid interconnecting PEEK mandrel.

The invention claimed is:

1. An orthogonal electrical connector system comprising:
an electrical conductor seal mandrel adapted to attach to an electrical submersible pump (ESP) power cable, the ESP power cable providing at least three ESP electrical conductors connecting to an electrical conductor from a coiled tubing,
wherein the electrical conductor seal mandrel comprises a non-conductive cable splice sleeve in which the at least three ESP electrical conductors are received, the cable splice sleeve providing at least three spaced ports and at least three interior electrical plugs, wherein respective interior plugs of the at least three interior electrical plugs are positioned at least partially in respective ports of the at least three spaced ports, and wherein the at least three interior plugs extend orthogonally to a longitudinal centerline of the cable splice sleeve, and
wherein the at least three spaced ports separately extend through the cable splice sleeve, such that a portion of the cable splice sleeve is between each of the at least three spaced ports and the at least three spaced ports do not extend through a common lateral opening in the cable splice sleeve, and wherein the at least three spaced ports are configured to be aligned with at least three respective ports of an outer bowl of a wellhead; and
at least three exterior plugs each configured to be separately inserted through the at least three separate ports of the outer bowl of the wellhead, extend orthogonally to the longitudinal centerline of the cable splice sleeve through a respective one of the at least three ports, and into the at least three interior plugs in the cable splice sleeve.

2. The orthogonal electrical connector system of claim 1, wherein the at least three spaced ports are positioned vertically within the cable splice sleeve.

3. The orthogonal electrical connector system of claim 1, wherein the at least three spaced ports are positioned horizontally within the cable splice sleeve.

4. The orthogonal electrical connector system of claim 1, wherein the at least three ESP conductors extend through the seal mandrel sealed with epoxy surrounding each conductor within a sleeve mandrel retaining a mini-mandrel within a threaded mandrel sleeve attached to a slip connection.

5. The orthogonal electrical connector system of claim 1, wherein the non-conductive cable splice sleeve is configured to be aligned within the wellhead to assure alignment of the at least three spaced ports.

6. The orthogonal electrical connector system of claim 1, wherein the at least three spaced ports are separated vertically apart from one another.

7. The orthogonal electrical connector system of claim 1, wherein the at least three ESP electrical conductors extend vertically through the seal mandrel and into the cable splice sleeve.

8. The orthogonal electrical connector system of claim 1, wherein the electrical conductor seal mandrel comprises a plurality of manifolds that are stacked together and connected to the cable splice sleeve, each of the plurality of manifolds providing a respective one of the at least three spaced ports.

9. The orthogonal electrical connector system of claim 1, wherein the seal mandrel comprises a seal cup through which the at least three ESP conductors extend.

10. An orthogonal electrical connector system, comprising:
a cable splice sleeve configured to be coupled to a coiled tubing, such that a plurality of electrical submersible pump (ESP) conductors of an ESP power cord extending in the coiled tubing extend into the cable splice sleeve, wherein the cable splice sleeve defines a plurality of ports therein; and
a plurality of plugs positioned separately at least partially in respective ports of the plurality of ports, wherein the plurality of plugs extend in a direction orthogonal to a longitudinal centerline of the cable splice sleeve, and wherein the plurality of plugs are configured to receive a plurality of conductors of an external plug in the direction orthogonal to the longitudinal centerline, so as to electrically connect the plurality of conductors of the external plug to the plurality of ESP conductors,
wherein the plurality of ports separately extend through the cable splice sleeve, such that a portion of the cable splice sleeve is between each of the plurality of ports and the plurality of ports do not extend through a common lateral opening in the cable splice sleeve, and wherein the plurality of ports are configured to be aligned with respective ports of an outer bowl of a wellhead.

11. The orthogonal electrical connector system of claim 10, further comprising a mini-mandrel coupled to the cable splice sleeve and configured to be positioned between the cable splice sleeve and the coiled tubing, wherein the plurality of ESP conductors extend entirely through the mini-mandrel.

12. The orthogonal electrical connector system of claim 10, further comprising the wellhead, the cable splice sleeve being positioned within the wellhead.

13. The orthogonal electrical connector system of claim 12, wherein the wellhead is configured to receive the plurality of conductors of the external plug laterally therethrough and into the plurality of plugs.

14. The orthogonal electrical connector system of claim 10, further comprising a plurality of connectors each in communication with a respective one of the plurality of ports, and configured connect to a respective one of the plurality of ESP conductors, so as to electrically connect the plurality of conductors of the external plug to the plurality of ESP conductors.

15. The orthogonal electrical connector system of claim 14, wherein the plurality of connectors are configured to receive the plurality of ESP conductors vertically therein, so as to make an electrical connection therewith.

16. The orthogonal electrical connector system of claim 10, wherein the plurality of ports are vertically spaced apart from one another.

17. An orthogonal electrical connector system comprising:
an electrical conductor seal mandrel adapted to attach to an electrical submersible pump (ESP) power cable, the ESP power cable providing ESP electrical conductors connecting to an electrical conductor from a coiled tubing,
wherein the electrical conductor seal mandrel comprises a non-conductive cable splice sleeve in which the ESP electrical conductors are received, the cable splice sleeve defining spaced ports extending separately through the cable splice sleeve such that a portion of the cable splice sleeve is between each of the spaced ports, the spaced ports being configured to be aligned with respective ports of an outer bowl of a wellhead, wherein the cable splice sleeve comprises interior electrical plugs, wherein respective interior plugs of the interior electrical plugs are positioned at least partially in respective ports of the spaced ports, and wherein the interior plugs extend orthogonally to a longitudinal centerline of the cable splice sleeve; and exterior plugs each configured to be separately inserted through a respective one of the ports of the outer bowl of the wellhead, extend orthogonally to the longitudinal centerline of the cable splice sleeve through a respective one of the ports, and extend into the interior plugs in the cable splice sleeve.

\* \* \* \* \*